US012660742B2

(12) United States Patent
Thompson

(10) Patent No.: US 12,660,742 B2
(45) Date of Patent: Jun. 23, 2026

(54) AGRICULTURAL PRODUCT DELIVERY SYSTEM AND METHOD

(71) Applicant: CNH Industrial Canada, Ltd., Saskatoon (CA)

(72) Inventor: Dennis George Thompson, Eagle Ridge (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 978 days.

(21) Appl. No.: 17/827,151

(22) Filed: May 27, 2022

(65) Prior Publication Data

US 2023/0380331 A1 Nov. 30, 2023

(51) Int. Cl.
A01C 7/08 (2006.01)
A01C 7/06 (2006.01)
A01C 23/00 (2006.01)

(52) U.S. Cl.
CPC ............... A01C 7/084 (2013.01); A01C 7/06 (2013.01); A01C 23/007 (2013.01)

(58) Field of Classification Search
CPC ........... A01C 7/084; A01C 7/081; A01C 7/08; A01C 7/00; A01C 7/06; A01C 23/007; A01C 23/00
See application file for complete search history.

(56) References Cited

U.S. PATENT DOCUMENTS 5,979,343 A 11/1999 Gregor et al.
5,996,516 A 12/1999 Benneweis et al.

6,584,920 B1 7/2003 Cresswell
7,669,538 B2 3/2010 Memory et al.
8,001,914 B2 8/2011 Peterson et al.
8,522,700 B2 9/2013 Landphair
8,915,200 B2 12/2014 Barsi et al.
9,144,190 B2 9/2015 Henry et al.
9,788,475 B2 10/2017 Henry
9,814,175 B2 11/2017 Henry
9,888,622 B2 2/2018 Henry
2019/0003600 A1 1/2019 Reich et al.
2019/0021214 A1 1/2019 Roberge et al.

FOREIGN PATENT DOCUMENTS

CA 2291321 5/2001
CA 2398143 2/2004
DE 60304072 T2 * 11/2006 ............. B05B 13/06

* cited by examiner

*Primary Examiner* — Christopher J. Novosad
(74) *Attorney, Agent, or Firm* — Dority & Manning, P.A.

(57) ABSTRACT

An agricultural product delivery system includes a flow control system defining a first channel and a second channel. A first flow regulation device is positioned within the first channel. A second flow regulation device is positioned within the second channel. An air source is positioned upstream of the flow control system and is fluidly coupled with the flow control system. A computing system is communicatively coupled to the flow control system. The computing system is configured to receive an input to alter the first airstream within the first channel to a third airstream and alter at least one of the flow control system or the air source to maintain the second airstream through the second channel while the third airstream is provided to the first channel.

14 Claims, 6 Drawing Sheets

AGRICULTURAL PRODUCT DELIVERY SYSTEM AND METHOD

FIELD

The present disclosure generally relates to agricultural product application equipment, and in particular, to a product delivery system for an agricultural air cart assembly.

BACKGROUND

Agricultural seeders may be employed to deposit an agricultural product, such as seed, fertilizer, pesticide, and other chemicals and materials, into soil. Many seeders include the agricultural product dispensing implement that is towed behind a tractor or similar vehicle for distributing agricultural product onto a furrowed farmland or similar planting surface.

The agricultural seeders may include one or more ground engaging tools or openers that form a seeding path for depositing the agricultural product into the soil. The openers are used to break the soil to enable seed deposition. After the agricultural product is deposited, each opener is followed by a packer wheel that packs the soil on top of the deposited material.

In certain configurations, an air cart is used to transport the agricultural product to the ground engaging tools within the seeding implement via a tube or distribution line. The air cart may also include a metering system configured to deliver metered quantities of the agricultural product into the tube or distribution line that is transferred to the ground engaging tools. The metering system will control distribution from the one or more tanks to distribution lines such that each tank provides the agricultural product at a desired rate. During operation, however, a generally equal amount of agricultural product may be delivered to each distribution line, which may be disadvantageous in some instances. Accordingly, an improved system and method for altering an amount of deposited agricultural product between first and second distribution lines would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural product delivery system that includes a flow control system defining a first channel and a second channel. A first flow regulation device is positioned within the first channel. A second flow regulation device is positioned within the second channel. An air source is positioned upstream of the flow control system and fluidly coupled with the flow control system. A computing system is communicatively coupled to the flow control system. The computing system is configured to receive an input to alter a first airstream within the first channel to a third airstream and alter at least one of the flow control system or the air source to maintain a second airstream through the second channel while the third airstream is provided to the first channel.

In some aspects, the present subject matter is directed to a method for an agricultural operation that includes producing an airflow from an air source. The method also includes forming a first airstream through a first channel of an air distribution assembly and a second airstream through a second channel of the air distribution assembly from the airflow. The method further includes receiving an input, through a computing system, to alter the first airstream through the first channel to a third airstream. Lastly, the method includes manipulating, with the computing system, at least one of the air source or the air distribution assembly to maintain the second airstream through a second channel of the air distribution assembly while providing the third airstream through the first channel.

In some aspects, the present subject matter is directed to an agricultural product delivery system that includes a flow control system defining a first channel and a second channel, wherein a first flow regulation device is positioned within the first channel. An air source is positioned upstream of the flow control system and fluidly coupled with the flow control system. A computing system is communicatively coupled to the flow control system. The computing system is configured to receive an input to alter a position of the first flow regulation device; and alter an amount of airflow produced by the air source in response to the altering the position of the first flow regulation device.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
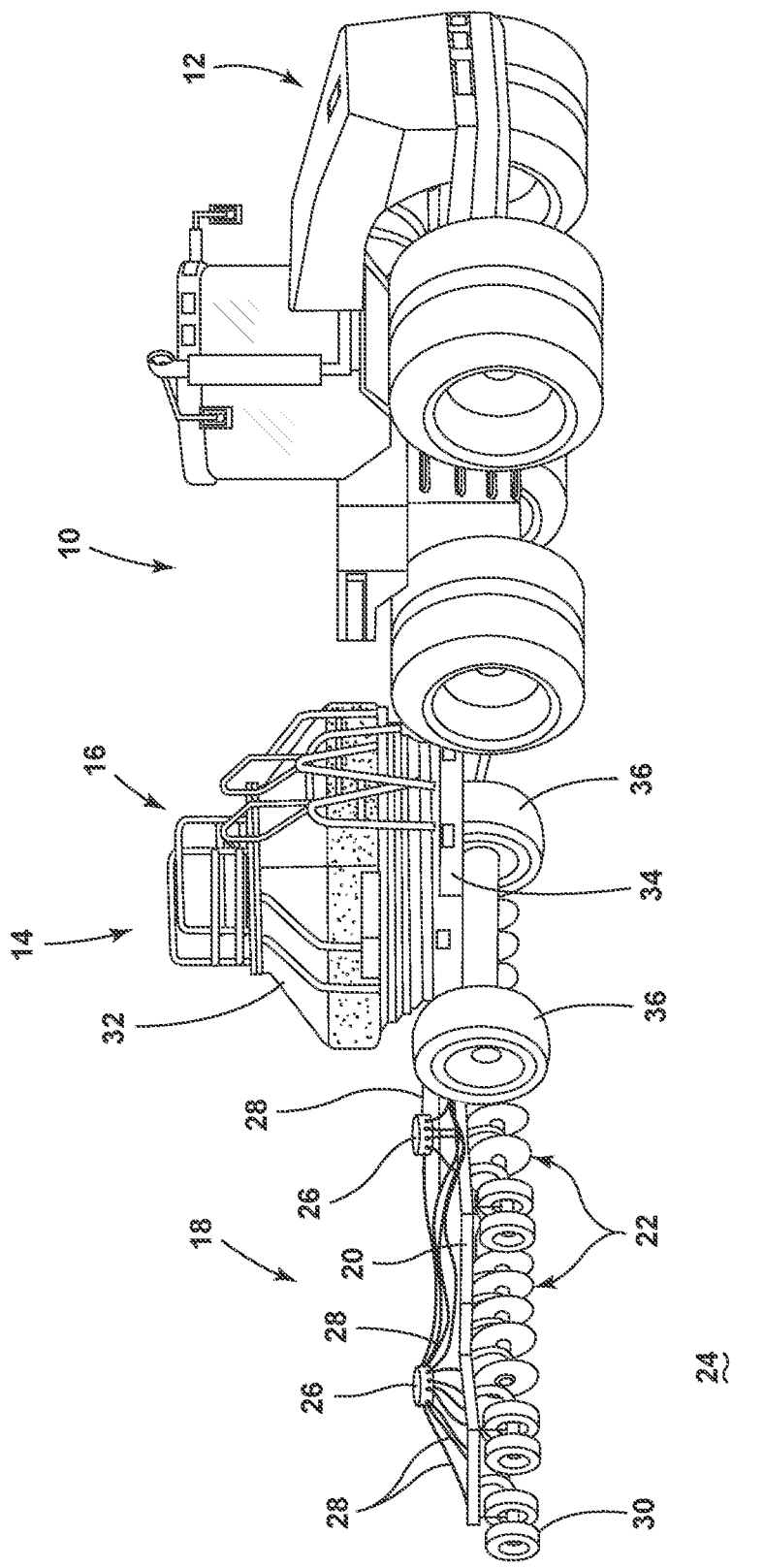
FIG. 1 illustrates a perspective view of an agricultural vehicle and an air cart assembly in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a material within a fluid circuit. For example, "upstream" refers to the direction from which a material flows, and "downstream" refers to the direction to which the material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, in some implementations, the present subject matter is directed to an agricultural product delivery system. The product delivery system includes an air source that produces an airflow. The airflow may be supplied to an air distribution assembly, which may separate the airflow from the air source into one or more airstreams that are directed through one or more distribution lines. In some instances, the air distribution assembly can include a manifold and/or a flow control system.

In general, the flow control system may direct one or more airstreams that are formed from the airflow of the air source through one or more channels. In some instances, each channel may include a flow regulation device. It will be appreciated that each airstream may have a common or varied different pressure, volume, and/or velocity from any other airstream during various time periods. Each respective airstream is provided to a respective distribution line. For example, a first airstream that is provided through a first channel of the flow control assembly may be provided to a first distribution line and a second airstream that is provided through a first channel of the flow control assembly may be provided to a second distribution line.

In various examples, an agricultural product is stored within a storage tank and is gravity fed into a metering system that is operably coupled with the distribution lines downstream of the air distribution assembly. The metering system can include sectioned, independently controllable meters, such as a rollers, to regulate the flow of an agricultural product from the one or more storage tanks into the airflow provided by the air source within each respective distribution line. The airstream (e.g., from the channels) then carries the agricultural product through the distribution lines to an implement to supply ground engagement tools with the agricultural product for deposition within soil.

In some instances, a computing system may be communicatively coupled to the flow control system. The computing system is configured to receive an input to alter a first airstream within the first channel to a third airstream and alter at least one of the flow control system or the air source to maintain the second airstream through the second channel while the third airstream is provided to the first channel. In some instances, altering at least one of the flow control system or the air source can include altering an amount of power provided to the air source from a power source. Additionally or alternatively, altering at least one of the flow control system or the air source can include altering a position of an exhaust flow regulation device. Additionally or alternatively, altering at least one of the flow control system or the air source can include altering a position of a first flow regulation device positioned within the first channel or a position of a second flow regulation device positioned within the second channel.

Figure 2:
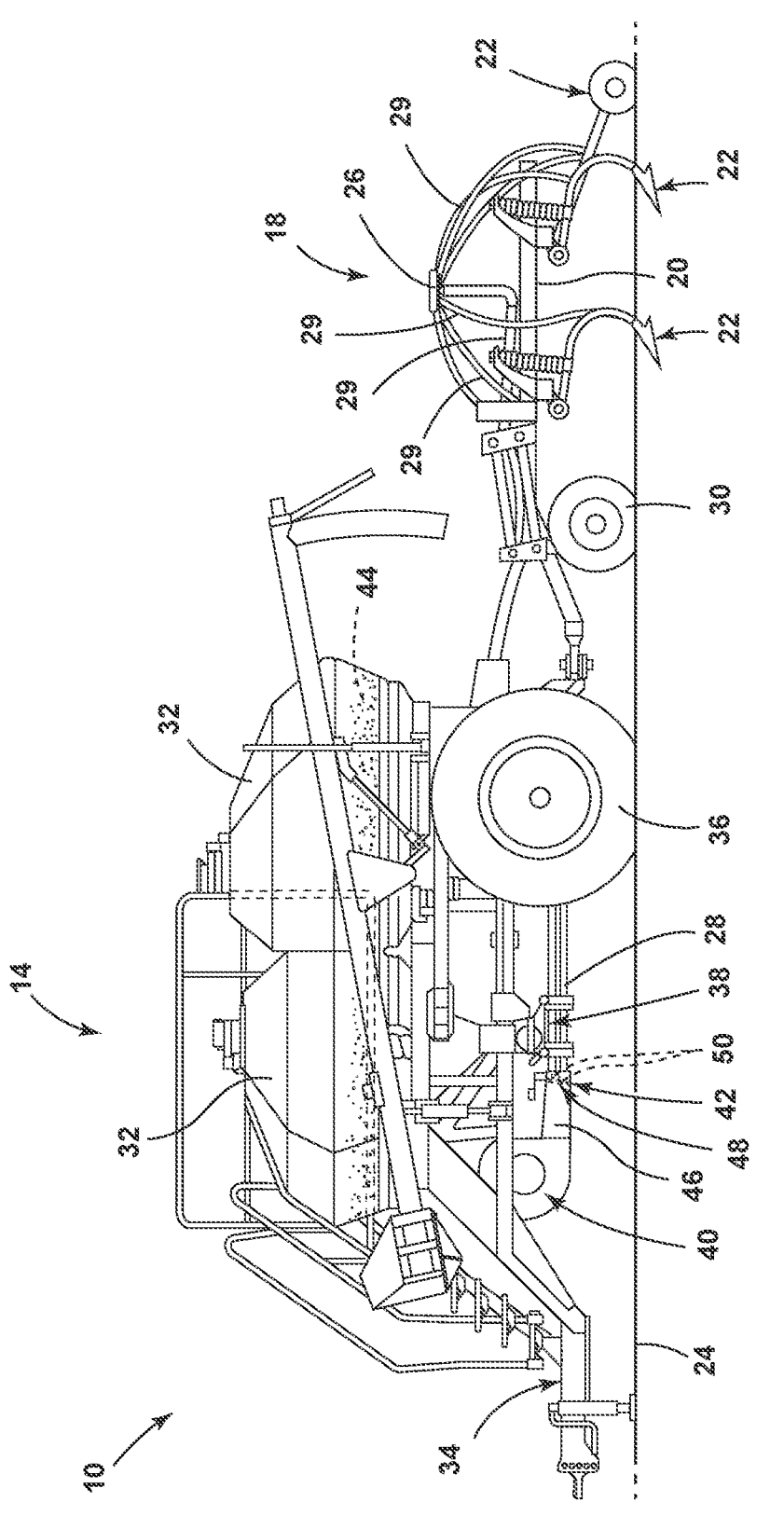
FIG. 2 illustrates a side view of the air cart assembly in accordance with aspects of the present subject matter.

Referring now to FIGS. 1 and 2, an agricultural product delivery system 10 is shown that includes a vehicle 12 and an agricultural air cart assembly 14. The agricultural air cart assembly 14 can include an air cart 16 and a product dispensing implement 18. The implement 18 can include a frame 20 that supports one or more ground engaging tools 22 (e.g., opener, row unit, outlet). The one or more ground engaging tools 22 is configured to excavate the soil 24 for deposition of an agricultural product 44, such as seed, fertilizer, pesticide, and other chemicals and materials, into the soil 24. In the illustrated example, the ground engaging tool 22 receives the agricultural product 44 from a product distribution header 26 via a distribution line (e.g., a primary distribution line 28 upstream of the header 26 and a secondary distribution line 29 extending between the header 26 and the ground engaging tool 22). As illustrated, the implement 18 also includes one or more wheel assemblies 30 which contact the soil 24 and enable the implement 18 to be pulled by the vehicle 12.

The air cart 16 may be coupled to the implement 18 and towed in front of (or behind) the implement 18. As will be appreciated, in certain embodiments, the air cart 16 may be towed behind the vehicle 12 with the implement 18 towed behind the air cart 16, or vice versa. Likewise, the implement 18 and the air cart 16 may be part of a single unit, or the implement 18 and the air cart 16 may be separate units that are coupled together.

The air cart 16 can include one or more storage tanks 32 (e.g., a product tank), a frame 34, wheels 36, a metering system 38, an air source 40, and an air distribution assembly 42. The frame 34 includes a towing hitch configured to couple to the implement 18 and/or the tow vehicle 12. In certain configurations, the one or more storage tanks 32 includes multiple compartments for storing various flowable particulate agricultural products 44. For example, a first storage tank 32 may include seeds, and a second storage tank 32 may include a dry fertilizer. Alternatively, the air cart 16 may include multiple tanks 32 each configured to store a different agricultural product 44. In either configuration, the air cart 16 may be configured to deliver both the seeds and the fertilizer to the implement 18.

The air source 40 may be configured as a fan, a blower, a pressurized carrier, etc. that may be carried on the air cart assembly 14 and/or the vehicle 12. In operation, the air source 40 generates an airflow that carries an agricultural product 44 through various components of the product delivery system 10. In various examples, the air source 40 may be independently powered and/or powered by a power source 134 (FIG. 6) of the vehicle 12. For instance, in some examples, the air source 40 may be powered by a hydraulic motor or actuator that receives hydraulic pressure from a hydraulic system 136 of the vehicle 12.

In various instances, the airflow provided from the air source 40 is supplied to an air distribution assembly 42, which may separate the airflow from the air source 40 into one or more airstreams that are directed through one or more primary distribution lines 28. In some instances, the air distribution assembly 42 can include a manifold 46 or plenum and/or a flow control system 48. The manifold 46 defines an inlet 54 that receives airflow from the air source 40 and one or more outlets 56. The one or more outlets 56 of the manifold 46 may be fluidly coupled with respective channels 50 of the flow control system 48 downstream of the manifold 46. However, it will be appreciated that, in some instances, the flow control system 48 may be operably coupled with the air source 40 without the manifold 46 without departing from the scope of the present disclosure.

In general, the flow control system 48 may direct one or more airstreams that are formed from the airflow of the air source 40 through one or more channels 50. It will be appreciated that each airstream may have a common or varied different pressure, volume, and/or velocity from any other airstream. Each respective airstream is provided to a respective primary distribution line 28. For example, a first airstream that is provided through a first channel 50 of the flow control assembly may be provided to a first primary distribution line 28 and a second airstream that is provided through a first channel 50 of the flow control assembly may be provided to a second primary distribution line 28.

In various examples, an agricultural product 44 within the storage tank 32 is gravity fed into the metering system 38. The metering system 38 can include sectioned, independently controllable meters 52 (FIG. 3), such as a roller, to regulate the flow of an agricultural product 44 from the one or more storage tanks 32 into the airflow provided by the air source 40 within each respective primary distribution line 28. The airstream (e.g., from the channels 50) then carries the agricultural product 44 through the primary distribution lines 28 and/or the secondary distribution lines 29 thereby supplying the ground engaging tools 22 with the agricultural product 44 for deposition within the soil 24. In various examples, each meter 52 of the metering system 38 may be coupled to its own primary distribution line 28, and each primary distribution line 28 may be coupled to its own header 26. Further, each header 26 may be coupled to its own set of secondary distribution lines 29 to feed its own one or more ground engaging tools 22.

Figure 3:
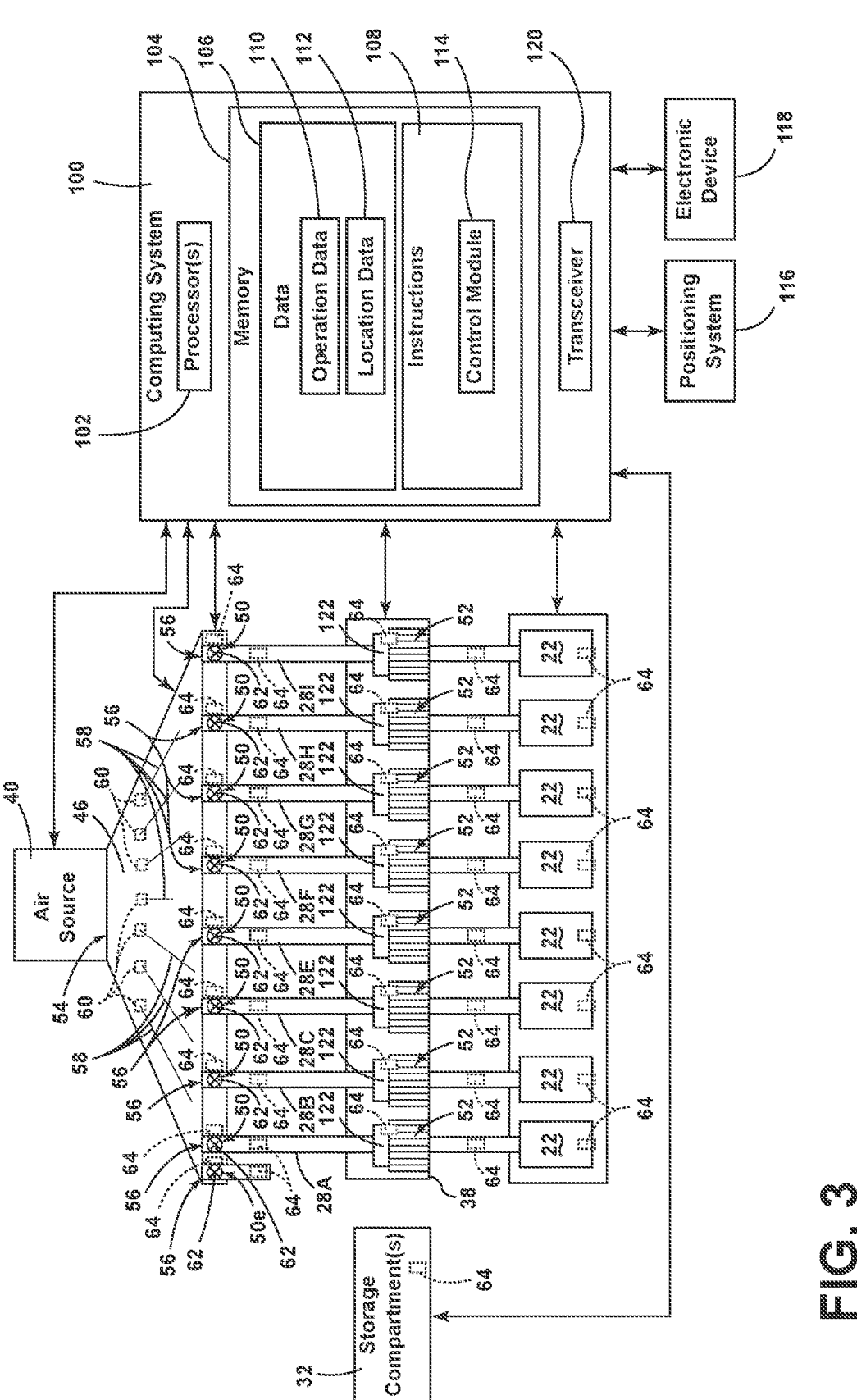
FIG. 3 is a schematic view of a product delivery system in accordance with aspects of the present subject matter.

Referring now to FIG. 3, in general, the product delivery system 10 can include at least the storage tank(s) 32, the air source 40, the air distribution assembly 42 (including the manifold 46 and/or the flow control system 48), the primary distribution lines 28, the product metering system 38, and the ground engaging tools 22. For example, the agricultural product 44 (FIG. 1) may initially be located within a storage tank 32, which may be carried on the air cart 16. The product delivery system 10 transfers the product using the product metering system 38 to the primary distribution lines 28 to deliver the product to the ground engaging tools 22 of the implement 18. In the illustrated embodiment, the air source 40 provides airflow to the primary distribution lines 28 to provide a biasing force, via the airflows, to urge the product through the product delivery system 10 to the soil 24.

In the illustrated example, the air source 40 may provide air to the manifold 46. As provided herein, the manifold 46 defines an inlet 54 that receives air from the air source 40 and one or more outlets 56. The manifold 46 may further include one or more guide vanes 58 for directing airflow to the one or more outlets 56 defined by the manifold 46. In some instances, the guide vanes 58 may be configured to direct airflow more consistently to each of the outlets 56 when compared to a manifold 46 that is free of guide vanes 58. In some instances, the guide vanes 58 may be operably coupled with one or more actuators such that one or more of the guide vanes 58 may be movable within the manifold 46 to direct various amounts of airflow towards various outlets 56 of the manifold 46, which, in turn, forms the various airstreams within the channels 50 of the flow control system 48.

The one or more outlets 56 of the manifold 46 may be fluidly coupled with respective channels 50 of the flow control system 48 downstream of the manifold 46. However, it will be appreciated that, in some instances, the flow control system 48 may be operably coupled with the air source 40 without the manifold 46 without departing from the scope of the present disclosure. In some instances, one or more of the channels 50 of the flow control system 48 may be operably coupled with the primary distribution lines 28. Additionally or alternatively, one or more of the channels 50 of the flow control system 48 may be free of a downstream primary distribution line 28 to form an exhaust channel 50E.

Additionally, the airstreams through any of the or more channels 50 of the flow control system 48 may be controllable that is provided to the primary distribution lines 28 downstream of the flow control system 48. For example, in the illustrated embodiment, each channel 50 may include its flow regulation device 62 configured to regulate the airstream that is provided to the primary distribution line 28. The flow regulation device 62 may be a valve configured to permit or restrict the airflow. For instance, the flow regulation device 62 may be a venting valve (e.g., pressure relief valve), a butterfly valve, a restrictive orifice, and/or any other practicable device. Alternatively or additionally, the air source 40 may include multiple air sources 40 (e.g., multiple fans or blowers), wherein a respective air source 40 is coupled to and provides an airflow to its respective channel 50 of the flow control system 48.

In the example illustrated in FIG. 3, the metering system 38 is downstream of the flow control system 48. In various examples, the agricultural product 44 (FIG. 1) is gravity fed into the metering system 38 from the storage tank(s) 32. In operation, the metering system 38 meters product to the primary distribution lines 28, and the airflow carries the metered product toward the ground engaging tools 22. In accordance with some examples, the product metering system 38 includes a separate, independently controllable meters 52 (e.g., meter roller) for each primary distribution line 28, where each separate meter 52 dispenses agricultural product 44 (FIG. 1) from the storage tank(s) 32 of the air cart 16 to its respective primary distribution line 28. Further, the air source 40 is controllable to provide different airstreams having various flow dynamics (e.g., pressure, volume, velocity, etc.) to each primary distribution line 28 based on the type and/or amount of agricultural product 44 (FIG. 1) that is transferred through each primary distribution line 28. Accordingly, the metering rates for each meter 52 are independently controllable, and the airflow is independently controllable to accommodate the independent metering rates. Thus, as shown in the illustrated example, a first primary distribution line 28 may feed a first amount of product to a first ground engaging tool 22 during a defined period and a second primary distribution line 28 may feed a second amount of product to a second ground engaging tool 22 during the defined period with the first amount being varied from the second amount. Additionally or alternatively, if a first primary distribution line 28 provides product to a first number of ground engaging tools 22 (e.g., a single ground engaging tool 22), and a second primary distribution line 28 provides product to a second number of ground engaging tools 22 (e.g., two ground engaging tools 22) different than the first number, the first primary distribution line 28 feeding product to fewer ground engaging tools 22 may receive less product (e.g., via a slower turn rate of the associated meter 52) than the primary distribution line 28 feeding more ground engaging tools 22.

In accordance with various examples, a computing system 100 may be communicatively coupled to the air source 40, the flow control system 48, the metering system 38, the ground engaging tools 22, the storage tank(s) 32, and/or sensors 64 associated with components thereof to regulate metering of product from the storage tank 32 to the implement 18 and airflow from the air source 40 to the distribution lines 28.

In general, the computing system 100 may comprise any suitable processor-based device, such as a computing device or any suitable combination of computing devices. Thus, in several embodiments, the computing system 100 may include one or more processors 102 and associated memory 104 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 104 of the computing system 100 may generally comprise memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 104 may generally be configured to store information accessible to the processor 102, including data 106 that can be retrieved, manipulated, created, and/or stored by the processor 102 and instructions 108 that can be executed by the processor 102, when implemented by the processor 102, configure the computing system 100 to perform various computer-implemented functions, such as one or more aspects of the image processing algorithms and/or related methods described herein. In addition, the computing system 100 may also include various other suitable components, such as a communications circuit or module, one or more input/output channels, a data/control bus, and/or the like.

In various embodiments, the computing system 100 may correspond to an existing controller of the agricultural work vehicle 12, the air cart assembly 14, and/or the computing system 100 may correspond to a separate processing device. For instance, in some embodiments, the computing system 100 may form all or part of a separate plug-in module or computing device that is installed relative to the work vehicle 12 or the air cart assembly 14 (FIG. 1) to allow for the disclosed product delivery system 10 and method to be implemented without requiring additional software to be uploaded onto existing control devices of the work vehicle 12 or the air cart assembly 14 (FIG. 1). Further, the various functions of the computing system 100 may be performed by a single processor-based device or may be distributed across any number of processor-based devices, in which instance such devices may be considered to form part of the computing system 100. For instance, the functions of the computing system 100 may be distributed across multiple application-specific controllers.

In several embodiments, the data 106 may be information received and/or generated by the computing system 100 that is stored in one or more databases. For instance, as shown in FIG. 3, the memory 104 may include an operation database 110 for storing application operational data that is received from the various components of the product delivery system 10. Moreover, in addition to initial or raw sensor data received from the various components, final or post-processing operation data (as well as any intermediate operation data created during data processing) may also be stored within the operation database 110.

In some instances, the operational data may be captured by the one or more components of the product delivery system 10 and/or one or more operation sensors 64 that are operably coupled with one or more components of the product delivery system 10. For example, the operation sensors 64 may be operably coupled with the air source 40, the flow control system 48, the metering system 38, the ground engaging tools 22, the storage tank(s) 32. It will be appreciated that each sensor may be coupled to the computing system 100, a remote device, and/or an electronic device 118 through various wired or wireless communication protocols, including any combination of wired and/or wireless communication mechanisms.

Additionally, in several embodiments, the memory 104 may also include a location database 112 storing location data of the work vehicle 12 and/or the air cart assembly 14 (FIG. 1). For example, in some embodiments, the positioning system 116 may be configured to determine the location of the work vehicle 12 and/or the air cart assembly 14 (FIG. 1) by using a satellite navigation positioning system 116 (e.g. a GPS system, a Galileo positioning system, the Global Navigation satellite system (GLONASS), the BeiDou Satellite Navigation and Positioning system, a dead reckoning device, and/or the like). In such embodiments, the location determined by the positioning system 116 may be transmitted to the computing system 100 (e.g., in the form location coordinates) and subsequently stored within the location database 112 for subsequent processing and/or analysis.

In several embodiments, the location data stored within the location database 112 may also be correlated to the operational data stored within the operation database 110. For instance, in some embodiments, the location coordinates derived from the positioning system 116 and the operational data may both be time-stamped. In such embodiments, the time-stamped data may allow each individual set of data captured by the sensors 64 to be matched or correlated to a corresponding set of location coordinates received from the positioning system 116, thereby allowing the data to be associated with a location of the soil 24.

With further reference to FIG. 3, in several embodiments, the instructions 108 stored within the memory 104 of the computing system 100 may be executed by the processor 102 to implement a control module 114. The control module 114 may utilize any data processing techniques or algorithms, such as by applying corrections or adjustments to the data, filtering the data to remove outliers, implementing sub-routines or intermediate calculations, and/or by performing any other desired data processing-related techniques or algorithms. In general, the control module 114 may be configured to operate one or more components of the product delivery system 10. In some instances, the control module 114 may alter or manipulate the operation of one or more components of the product delivery system 10 based on detected conditions. For example, the control module 114 may independently control each meter 52 of the metering system 38. For example, the control module 114 may independently control motors 122 coupled to each meter 52, thereby independently controlling a turn rate of the motors 122 and, thus, the meters 52. In other words, each meter 52 may include an independently controllable turn rate. In accordance with present examples, the computing system 100 may determine a turn rate for each motor and, thus, for each meter 52 coupled to each respective motor, based at least in part on the primary distribution line 28 coupled to each meter 52. For example, the control module 114 may instruct a lower metering rate (e.g., turn rate) to a first meter 52 operably coupled with a first primary distribution line 28 and a relatively higher second metering rate (e.g., turn rate) to a second meter 52 of the same metering system 38 that is operably coupled with a second primary distribution line 28.

Additionally or alternatively, the control module 114 may instruct the air source 40 to provide a first airflow with a higher velocity (and, thus, a higher dynamic pressure) to the manifold 46 at a first time and a second airflow with a relatively lower velocity (and, thus, a relatively lower dynamic pressure) to the manifold 46 at a second time.

Additionally or alternatively, the control module 114 may alter a position of each flow regulation device 62 within the flow control system 48 to vary a first airstream within a first channel 50 from a second airstream within a second channel 50. Additionally or alternatively, the control module 114 may alter a position of a flow regulation device 62 within the flow control system 48 to change a first airstream within a first channel 50 to a second airstream within the first channel 50. For example, a first flow regulation device 62 operably coupled with a first channel 50 may be placed in a first position thereby forming a first airstream that is delivered to a first primary distribution line 28 while a second channel 50 may be placed in a second position thereby forming a second airstream that is delivered to a second primary distribution line 28 that is different from the first airstream. In addition, when excess airflow is present (i.e., the volume of airflow exceeds the volume of each of the airstreams combined), the control module 114 may instruct the air source 40 to reduce an amount of generated airflow and/or the control module 114 may operate the flow regulation device 62 operably coupled with the exhaust channel 50E to prevent the excess airflow from causing one or more airstreams to exceed their defined dynamics. As such, when the airstream within a first channel 50 is altered, the exhaust channel 50E may be manipulated to reduce any effect of the change in airflow that may affect the remaining channels 50. Likewise, the control module 114 may alter an amount of airflow that may be passed through the exhaust channel 50E to increase an amount of airflow that may be used to form each of the airstreams without having to alter the operating conditions of the air source 40. Additionally or alternatively, the control module 114 may alter the operating conditions of the air source 40 to accommodate an alteration in airflow within the one or more channels 50.

Further, the computing system 100 may communicate via wired and/or wireless communication with one or more remote electronic devices 118 through a transceiver 120. The network may be one or more of various wired or wireless communication protocols, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. It will be appreciated that the electronic device 118 may be any one of a variety of computing devices and may include a processor and memory. For example, the electronic device 118 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Although the various control functions and/or actions are generally described herein as being executed by the computing system 100, one or more of such control functions/actions (or portions thereof) may be executed by a separate computing system 100 or may be distributed across two or more computing systems (including, for example, the computing system 100 and a separate computing system). For instance, in some embodiments, the computing system 100 may be configured to acquire data from the sensors 64 for subsequent processing and/or analysis by a separate computing system (e.g., a computing system associated with a remote server).

Figures 4, 5:
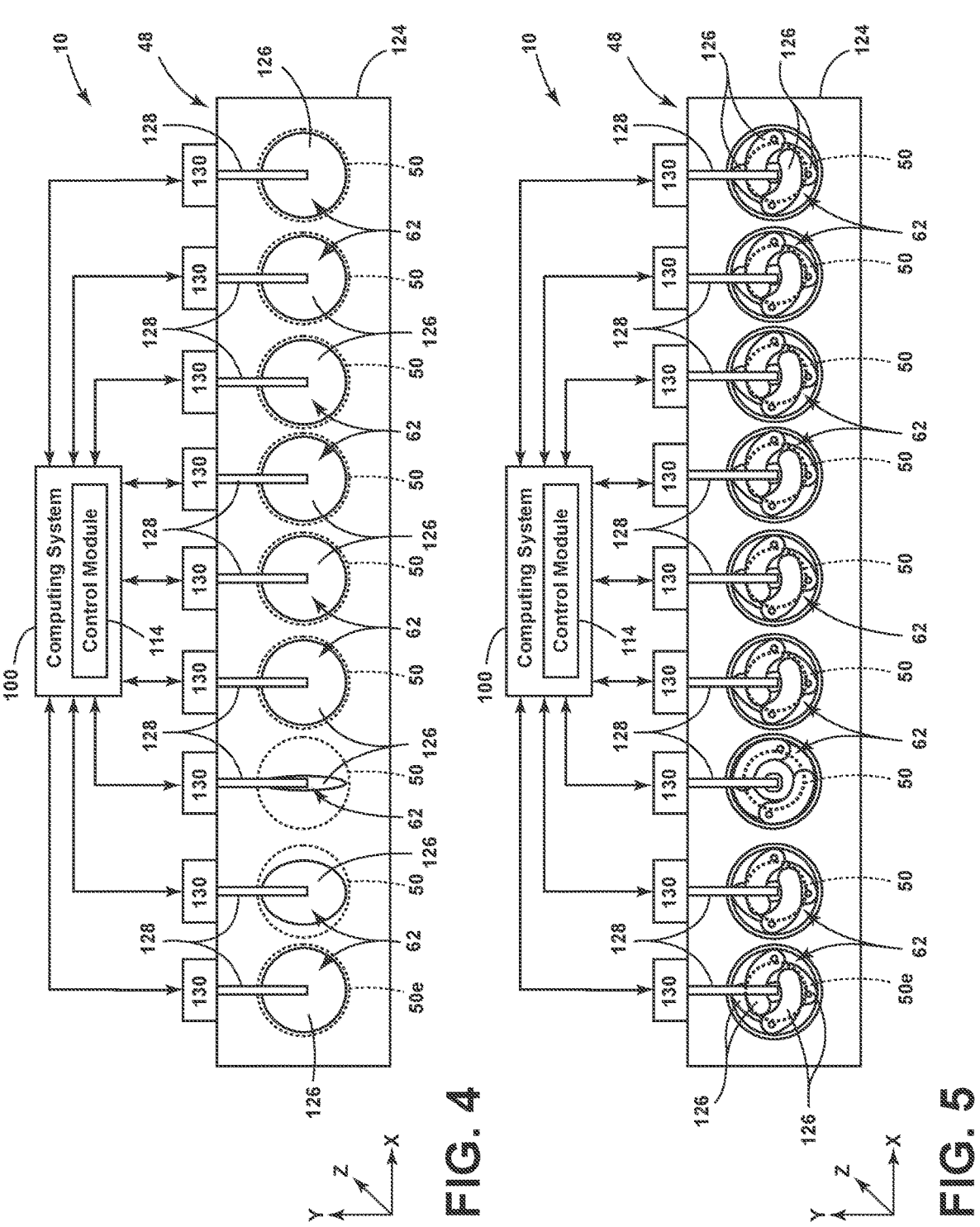
FIG. 4 is a front schematic view of a flow control system in accordance with aspects of the present subject matter.
FIG. 5 is a front schematic view of a flow control system in accordance with aspects of the present subject matter.

Referring to FIGS. 4 and 5, the flow control system 48 is illustrated having a housing 124 that defines the one or more channels 50 therethrough. As provided herein, in some instances, one or more of the channels 50 of the flow control system 48 may be operably coupled with the primary distribution lines 28 (FIG. 3). Additionally or alternatively, one or more of the channels 50 of the flow control system 48 may be free of a downstream distribution line 28 to form an exhaust channel 50E. A flow regulation device 62 may be positioned between an inlet and an outlet of each of the channels 50. The flow regulation device 62 can allow for varying airstreams through each respective channel 50 and/or prevent an airstream from passing through a defined channel 50.

Referring further to FIG. 4, in several examples, the flow regulation device 62 may include a control vane 126 disposed within one or more channels 50 of the flow control system 48. The vane 126 may be configured to restrict airflow between the inlet and the outlet of the channel 50. Each vane 126 may be selectively and variably movable about an axis to control airflow distribution across the flow control system 48. For instance, the vane axis may be generally aligned with a Y-axis that is perpendicular to an airstream flow direction. One or more control rods 128 may be fixedly secured to the vanes 126 to act as a drive shaft so that rotation of the control rod 128 may drive rotation of the vanes 126. In various examples, each of the vanes 126 may be independently movable for example, by a respective actuator 130 (e.g., electric motor, hydraulic motor, pneumatic motor, etc.) to move each of the vanes 126. Additionally or alternatively, more than one control rod 128 may be operably coupled with a common actuator 130, electric motor, hydraulic motor, pneumatic motor, etc., which may move each of the vanes 126 coupled with the common actuator 130, electric motor, hydraulic motor, pneumatic motor, etc. in concert and/or independently of one another.

Referring further to FIG. 5, in some examples, the flow regulation device 62 may include one or more vanes 126 that may pivot about respective axes that may be generally aligned with the Z-axis direction, which may be generally parallel to the airstream direction through the one or more channels 50. In various examples, the flow regulation device 62 may include any number (one or more) or vanes 126. For example, in the illustrated example of FIG. 5, the flow regulation device 62 includes four vanes 126 with each vane 126 defining a quarter-circular inner edge so that together the vanes 126 define a first orifice having a first area at the fully open position and a second orifice having a second area when moved from the fully open position with the second area being less than the first area.

Figure 6:
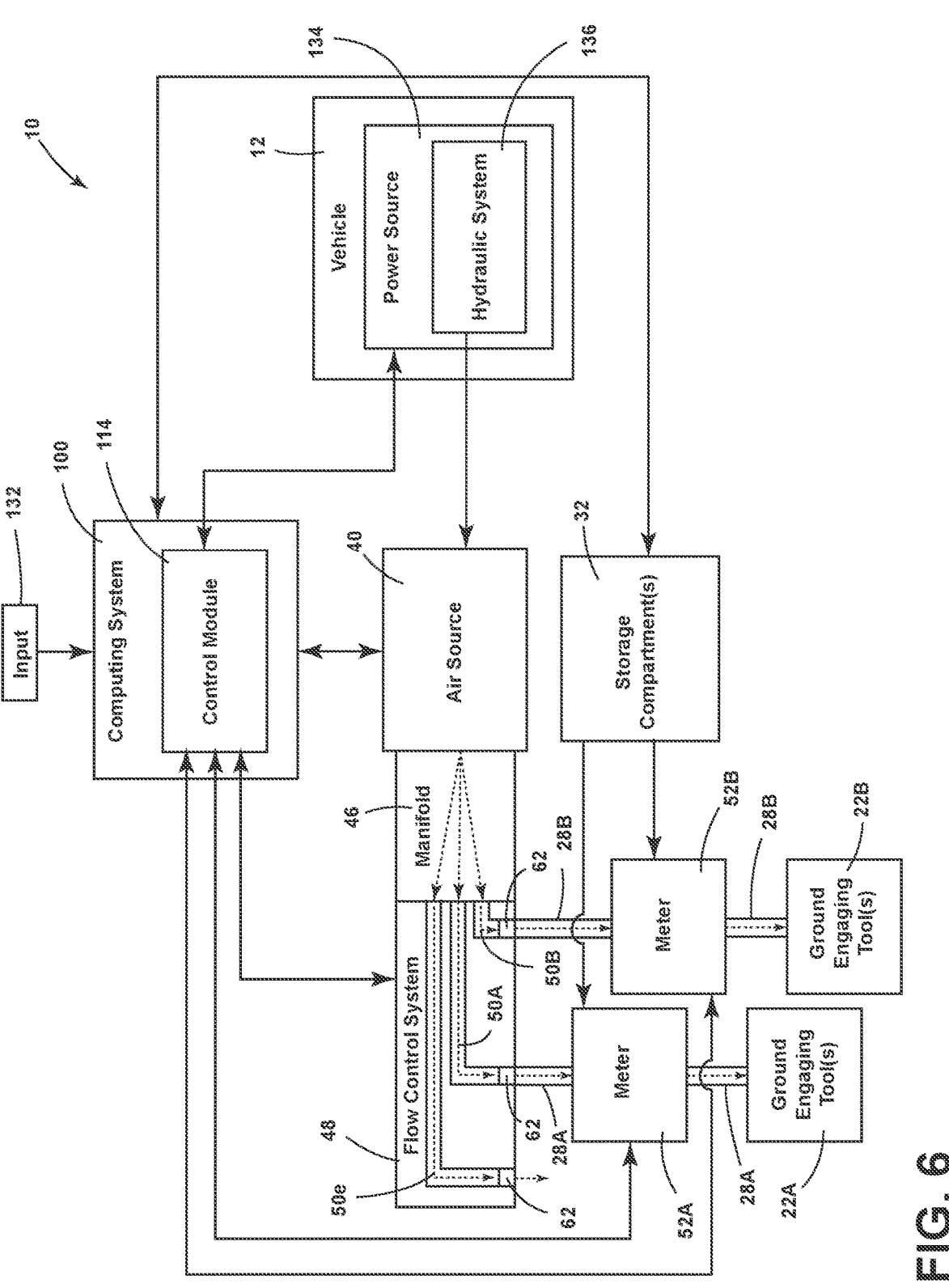
FIG. 6 is a schematic block diagram illustrating portions of the computing system operably coupled with the vehicle and the product delivery system in accordance with aspects of the present subject matter.

Referring now to FIG. 6, various components of the product delivery system 10 are illustrated in accordance with various aspects of the present disclosure. As shown, the control module 114 may receive data from various components of the product delivery system 10 and, in turn, alter or manipulate at least one of a manifold 46, a flow control system 48, and/or an air source 40. It will be appreciated that additional data may be provided from the illustrated components and/or other components of the product delivery system 10 that are utilized for determining an alteration to the product delivery system 10 (e.g., from one or more sensors 64 operably coupled with any component of the product delivery system 10 and/or any other component). As such, the inputs for the control module 114 and/or the outputs from the control module 114 may be varied from the example illustrated in FIG. 6. In addition, for illustrative purposes, the flow control system 48 defines a first channel 50A, a second channel 50B, and an exhaust channel 50E. The first and second primary distribution lines 28A, 28B are respectively fluidly coupled with the first channel 50A and the second channel 50B. In turn, a first meter 52A is operably coupled with the first primary distribution line 28A, and a second meter 52B is operably coupled with the second primary distribution line 28B. A first ground engaging tool 22A is fluidly coupled with the first meter 52A and a second ground engaging tool 22B is fluidly coupled with the second meter 52B. It will be appreciated that the flow control system 48 may include any number of channels 50 50A, 50B, the metering system 38 may include any number of meters 52A, 52B, and any number of ground engaging tools 22A, 22B may be operably coupled with each primary distribution line 28A, 28B without departing from the scope of the present disclosure.

As illustrated, the control module 114 may receive an input 132 related to an application rate of the agricultural product 44 (FIG. 1) to be deposited from each ground engaging tool 22A, 22B, which may be provided from a component of the vehicle 12 or the cart assembly, such as a user interface. Additionally or alternatively, the input 132 may be received from a device that is remote from the vehicle 12 and/or the cart assembly. In some instances, the input 132 may vary the application rate of a first ground engaging tool 22A from a second ground engaging tool 22B for various purposes, such as the implement traversing a turning condition, the product being deposited based on a variable prescription map, various products are deposited within the soil 24 (FIG. 2), and/or for any other purpose.

Based on the input 132, the control module 114 may determine a meter rate and an associated first airstream for producing a desired application rate from the first ground engaging tool 22A. Likewise, the control module 114 may determine a meter rate and an associated second airstream for producing a desired application rate from the second ground engaging tool 22B. In turn, the control module 114 may also determine a first operating condition of the air source 40 to produce a first airflow with the first airflow being generally equal to the first airstream and the second airstream. As provided herein, one or more of the channels 50A, 50B of the flow control system 48 may be fluidly coupled with distribution lines 28A, 28B that are configured to receive the respective airstreams. The metering system 38 can include sectioned, independently controllable meters 52A, 52B to regulate the flow of an agricultural product 44 (FIG. 1) from one or more storage tanks 32 into the airstreams within each respective primary distribution line 28A, 28B. One or more ground engaging tools 22A, 22B is fluidly coupled with each primary distribution line 28A, 28B downstream of each meter 52A, 52B that deposit the agricultural product 44 (FIG. 1) at the defined application rate.

During operation, the first channel 50A may continue to provide the first airstream to the first primary distribution line 28A for an initial time period and the second channel 50B may continue to provide the second airstream to the second primary distribution line 28B for the initial time period. When the first primary distribution line 28A is to receive a third airstream with the third airstream being less than the first airstream while the second primary distribution line 28B is to receive the second airstream, a position of the first flow regulation device 62 may be altered and/or a position of the second flow regulation device 62 may be altered. In turn, excess airflow may be present within the flow control system 48. In such instances, the control module 114 may alter or manipulate one or more components of the product delivery system 10 such that the third airstream is provided to the first primary distribution line 28A and the second airstream continues to be provided to the second primary distribution line 28B. For example, the control module 114 may alter an operating condition of the air source 40 from the first operating condition to a second operating condition. For instance, the second operating condition may be a decreased output of airflow from the first operating condition. To alter the air source 40 from the first operating condition to the second operating condition, the control module 114 may communicate with a power source 134 of the vehicle 12 (or any other power source operably coupled with the air source 40), such as a hydraulic system 136. In such instances, to cause the alteration of the air source 40 from the first operating to the second operation function, the control module 114 may direct the power source 134 to supply a reduced amount of power to the air source 40.

Additionally or alternatively, the control module 114 may alter a position of a flow regulation device 62 operably coupled with an exhaust channel 50E of the flow control system 48. For instance, the flow regulation device 62 within the exhaust channel 50E may be moved from a first position (e.g., a closed position) to a second position (e.g., an open position) to allow for the excess airflow to be exhausted externally of the first primary distribution line 28A and/or the second primary distribution line 28B.

When the first primary distribution line 28A is to receive a third airstream with the third airstream being greater than the first airstream while the second primary distribution line 28B is to receive the second airstream, a position of the first flow regulation device 62 may be altered and/or a position of the second flow regulation device 62 may be altered. In turn, additional airflow may be needed within the flow control system 48. In such instances, the control module 114 may alter or manipulate one or more components of the product delivery system 10 such that the third airstream is provided to the first primary distribution line 28A and the second airstream continues to be provided to the second primary distribution line 28B. For example, the control module 114 may alter an operating condition of the air source 40 from the first operating condition to a second operating condition. For instance, the second operating condition may be an increased output of airflow from the first operating condition. To alter the air source 40 from the first operating condition to the second operating condition, the control module 114 may communicate with a power source 134 of the vehicle 12 (or any other power source operably coupled with the air source 40), such as a hydraulic system 136 of the vehicle 12. In such instances, the control module 114 may direct the power source 134 to supply an increased amount of power to the air source 40.

Additionally or alternatively, the control module 114 may alter a position of a flow regulation device 62 operably coupled with an exhaust channel 50E of the flow control system 48. For instance, the flow regulation device 62 within the exhaust channel 50E may be moved from a first position (e.g., an open position) to a second position (e.g., a closed position) to allow for additional airflow to be provided to the first primary distribution line 28A and/or the second primary distribution line 28B.

As such, the system may allow for closed-loop control of the product delivery system 10 in which various components are regulated by the control module 114 to allow for the inputted application rate to be accomplished through one or more distribution lines 28A, 28B independently. In various examples, the product delivery system 10 may implement machine learning engine methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the computing system 100 and may be used to generate a predictive evaluation of the alterations to the air distribution assembly 42 and/or the air source 40 (e.g., via the power source 134). For instance, the control module 114 may alter the air distribution assembly 42. In turn, the product delivery system 10 may monitor any changes to the airstream within each respective primary distribution line 28A, 28B. Each change may be fed back into the control module 114 for further alterations to the air distribution assembly 42. Additionally or alternatively, the control module 114 may alter the amount of power provided by the power source 134 to the air source 40. In turn, the product delivery system 10 may monitor any changes to the airflow provided by the air source 40. Each change may be fed back into the control module 114 for further alterations to the power source 134.

Figure 7:
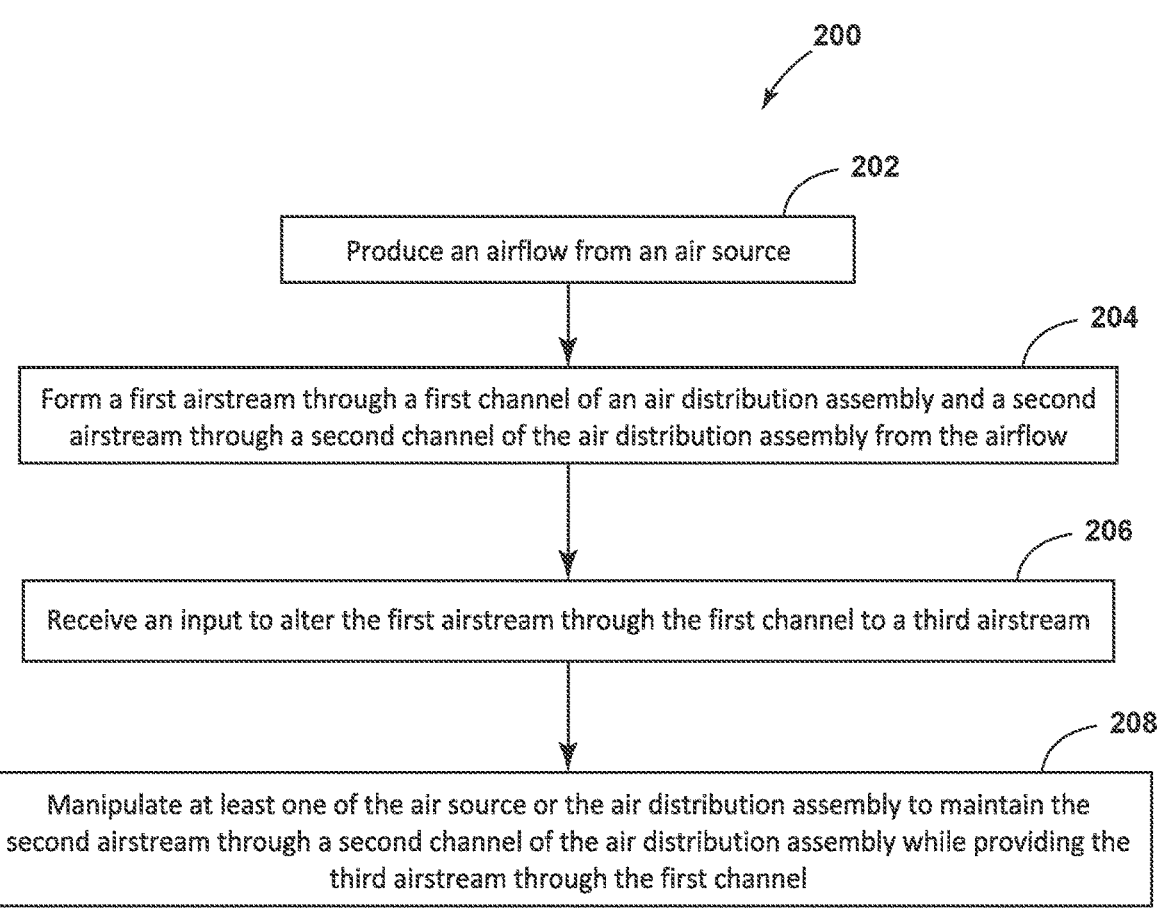
FIG. 7 illustrates a flow diagram of a method for an agricultural operation in accordance with aspects of the present subject matter.

Referring now to FIG. 7, a flow diagram of some examples of a method 200 for an agricultural operation is illustrated in accordance with aspects of the present subject matter. In general, the method 200 will be described herein with reference to the vehicle 12, the air cart assembly 14, and the product delivery system 10 described above with reference to FIGS. 1-6. However, the disclosed method 200 may generally be utilized with any suitable agricultural vehicle 12, the air cart assembly 14, and the product delivery system 10 and/or may be utilized in connection with a system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 7, at (202), the method 200 can include producing an airflow from an air source. The air source may be carried on the air cart assembly and/or the vehicle. In operation, the air source generates an airflow that carries an agricultural product through various components of the product delivery system.

At (204), the method 200 can include forming a first airstream through a first channel of an air distribution assembly and a second airstream through a second channel of the air distribution assembly from the airflow. As provided herein, the air distribution assembly can include a manifold and/or a flow control system. In some instances, the manifold may allow for airflow from the air source to be directed towards one or more channels, such as a first channel, a second channel, and/or an exhaust channel of the flow control system. The flow control system may be controllable to define an airstream through each respective channel, which may be provided to distribution lines downstream of the flow control system and/or exhausted from the control system. In addition, each channel may include its own flow regulation device configured to regulate the flow through each respective channel. Additionally or alternatively, the air source can include a first air source fluidly coupled with the first channel and a second air source operably coupled with the second channel.

At (206), the method 200 can include receiving an input to alter the first airstream through the first channel to a third airstream through a computing system. The input may be related to a defined application rate of the agricultural product for each of the row units. In some instances, the input may vary the application rate of a first ground engaging tool from a second ground engaging tool for various purposes, such as the implement traversing a turning condition, the product being deposited based on a variable prescription map, various products being deposited within the soil, and/or for any other purpose.

At (208), the method 200 can include manipulating at least one of the air source or the air distribution assembly to maintain the second airstream through a second channel of the air distribution assembly while providing the third airstream through the first channel with the computing system. In some instances, manipulating the air source further comprises altering an amount of power provided to the air source from a power source. Additionally or alternatively, manipulating the air distribution assembly further comprises altering a position of an exhaust flow regulation device. Additionally or alternatively, manipulating the air distribution assembly further comprises altering a position of a first flow regulation device positioned within the first channel or a position of a second flow regulation device positioned within the second channel.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural product delivery system comprising:
a flow control system defining a first channel and a second channel;
a first flow regulation device positioned within the first channel;
a second flow regulation device positioned within the second channel;
an air source positioned upstream of the flow control system and fluidly coupled with the flow control system;
a first distribution line positioned downstream of the flow control system and fluidly coupled with the first channel of the flow control system;
a second distribution line positioned downstream of the flow control system and fluidly coupled with the second channel of the flow control system, wherein the second distribution line receives a second airstream from the second channel;
a first meter configured to regulate the flow of an agricultural product from one or more storage tanks into the first distribution line downstream of the flow control system;
a second meter configured to regulate the flow of the agricultural product from the one or more storage tanks into the second distribution line downstream of the flow control system;
a first ground engaging tool operably coupled with the first distribution line downstream of the first meter;
a second ground engaging tool operably coupled with the second distribution line downstream of the second meter; and
a computing system communicatively coupled to the flow control system, the computing system being configured to:

receive an input to alter a first airstream within the first channel to a third airstream; and alter at least one of the flow control system or the air source to maintain the second airstream through the second channel while the third airstream is provided to the first channel, wherein the first distribution line receives the first airstream and the third airstream from the first channel.

2. The system of claim 1, further comprising:

a power source operably coupled with the air source, wherein an amount of power provided by the power source is manipulated to alter the air source to maintain the second airstream through the second channel while the third airstream is provided to the first channel.

3. The system of claim 1, wherein the flow control system further defines an exhaust channel, and wherein an exhaust flow regulation device is positioned within the exhaust channel.

4. The system of claim 3, wherein the exhaust flow regulation device is manipulated to alter the air source to maintain the second airstream through the second channel while the third airstream is provided to the first channel.

5. The system of claim 1, further comprising:

a manifold operably coupled with the flow control system, wherein the manifold includes one or more guide vanes to direct airflow from the air source to the first channel of the flow control system and the second channel of the flow control system.

6. The system of claim 1, wherein the first flow regulation device and the second flow regulation device are configured as respective variable restrictive orifices.

7. A method for an agricultural operation, the method comprising:

producing an airflow from an air source;

forming a first airstream through a first channel of an air distribution assembly and a second airstream through a second channel of the air distribution assembly from the airflow;

receiving an input, through a computing system, to alter the first airstream through the first channel to a third airstream, the input configured to vary an application rate of a first ground engaging tool from a second ground engaging tool; and manipulating, with the computing system, at least one of the air source or the air distribution assembly to maintain the second airstream through the second channel of the air distribution assembly while providing the third airstream through the first channel.

8. The method of claim 7, wherein manipulating the air source further comprises altering an amount of power provided to the air source from a power source.

9. The method of claim 7, wherein manipulating the air distribution assembly further comprises altering a position of an exhaust flow regulation device.

10. The method of claim 7, wherein the input to alter the first airstream through the first channel to the third airstream is based on a detected operating condition of a ground engaging tool operably coupled with the first channel through a distribution line.

11. The method of claim 7, wherein the air source includes a first air source fluidly coupled with the first channel and a second air source operably coupled with the second channel.

12. An agricultural product delivery system comprising:

an implement;

a flow control system operably coupled with the implement, the flow control system defining a first channel and a second channel, wherein a first flow regulation device is positioned within the first channel;

an air source positioned upstream of the flow control system and fluidly coupled with the flow control system; and a computing system communicatively coupled to the flow control system, the computing system being configured to:

receive an input to alter a position of the first flow regulation device, the input configured to vary an application rate of a first ground engaging tool from a second ground engaging tool for various purposes based on the implement traversing a turning condition; and alter an amount of airflow produced by the air source in response to the altering the position of the first flow regulation device.

13. The system of claim 12, further comprising:

a power source operably coupled with the air source, wherein altering the amount of airflow produced by the air source comprises altering an amount of power provided by the power source.

14. The system of claim 13, wherein the air source is positioned within an air cart assembly and the power source is positioned within a vehicle.

* * * * *